United States Patent
Cardona

(10) Patent No.: US 10,822,215 B2
(45) Date of Patent: Nov. 3, 2020

(54) FAIL SAFE BAR FOR CLUTCH TYPE BRAKE ADJUSTMENT

(71) Applicant: Otis Elevator Company, Farmington, CT (US)

(72) Inventor: Camilo Cardona, Middletown, CT (US)

(73) Assignee: Otis Elevator Company, Farmington, CT (US)

( * ) Notice: Subject to any disclaimer, the term of this patent is extended or adjusted under 35 U.S.C. 154(b) by 21 days.

(21) Appl. No.: 16/200,125

(22) Filed: Nov. 26, 2018

(65) Prior Publication Data

US 2020/0165111 A1 May 28, 2020

(51) Int. Cl.
| | | |
|---|---|---|
| *F16D 63/00* | (2006.01) | |
| *B66B 1/32* | (2006.01) | |
| *B66D 5/14* | (2006.01) | |
| *B66B 5/26* | (2006.01) | |
| *F16D 65/00* | (2006.01) | |

(52) U.S. Cl.
CPC .............. B66D 5/14 (2013.01); B66B 1/32 (2013.01); B66B 5/26 (2013.01); F16D 63/006 (2013.01); F16D 65/005 (2013.01)

(58) Field of Classification Search
CPC ... B66D 5/12; B66D 5/14; B66D 5/30; B66D 5/32; B66D 5/34; B66D 1/32; F16D 63/006; F16D 65/006; B66B 1/32
USPC .................. 188/31; 187/351, 356, 377, 378
See application file for complete search history.

(56) References Cited

U.S. PATENT DOCUMENTS

| | | | |
|---|---|---|---|
| 1,935,678 A | | 11/1933 | Valpey |
| 4,034,824 A | * | 7/1977 | Lucas ............... B60R 25/09 180/287 |
| 4,260,029 A | | 4/1981 | Morrison et al. |
| 4,916,792 A | | 4/1990 | Haubus |
| 5,263,802 A | | 11/1993 | Fichot et al. |
| 5,277,278 A | | 1/1994 | Mehlert et al. |
| 5,590,474 A | | 1/1997 | Lamb |

(Continued)

FOREIGN PATENT DOCUMENTS

| | | |
|---|---|---|
| CN | 202107476 U | 1/2012 |
| CN | 107032220 A | 8/2017 |

(Continued)

OTHER PUBLICATIONS

European Search Report; Application No. 19211664.8; dated Apr. 24, 2020; 6 pages.

*Primary Examiner* — Thomas J Williams
(74) *Attorney, Agent, or Firm* — Cantor Colburn LLP

(57) ABSTRACT

Disclosed is an elevator machine including: a plurality of stationary structures, including a proximate stationary structure and a distal stationary structure, a brake support that comprises the proximate stationary structure, a brake disc rotably supported in the brake support intermediate the plurality of stationary structures, the plurality of stationary structures and the brake disc each including a respective one of a plurality of orifices, and the plurality of orifices being mutually aligned and offset from a rotational axis of the brake disc to removably receive an elongated bar, wherein when the bar is positioned in the plurality of orifices, the brake disc is prevented from rotating, thereby preventing vertical movement of an elevator car in an elevator hoistway.

14 Claims, 5 Drawing Sheets

(56) References Cited

U.S. PATENT DOCUMENTS

| | | |
|---|---|---|
| 5,900,596 A | 5/1999 | Koshak et al. |
| 5,944,150 A * | 8/1999 | Hikari .................... B66D 5/14 |
| | | 188/161 |
| 6,578,672 B1 * | 6/2003 | Miyoshi .............. B66B 11/0453 |
| | | 187/254 |
| 7,080,717 B2 | 7/2006 | Ito |
| 7,114,924 B2 | 10/2006 | Munsch |
| 7,226,038 B1 | 6/2007 | Wickstrom |
| 7,428,951 B2 * | 9/2008 | Ito ............................ B66B 5/00 |
| | | 188/31 |
| 7,467,530 B2 * | 12/2008 | Torrado ................. B62H 5/141 |
| | | 188/265 |
| 7,926,189 B1 | 4/2011 | Pellegrino |
| 8,696,230 B2 | 4/2014 | Sanz Gamboa |
| 9,459,178 B2 | 10/2016 | Meduru et al. |
| 9,637,349 B2 | 5/2017 | Schroeder-Brumloop et al. |
| 2011/0147129 A1 | 6/2011 | Davis et al. |
| 2016/0221792 A1 | 8/2016 | Wang |

FOREIGN PATENT DOCUMENTS

| | | |
|---|---|---|
| EP | 0185447 A1 | 6/1986 |
| EP | 0545369 A2 | 6/1993 |
| EP | 2796403 A1 | 10/2014 |
| WO | 2007029310 A1 | 3/2007 |

* cited by examiner

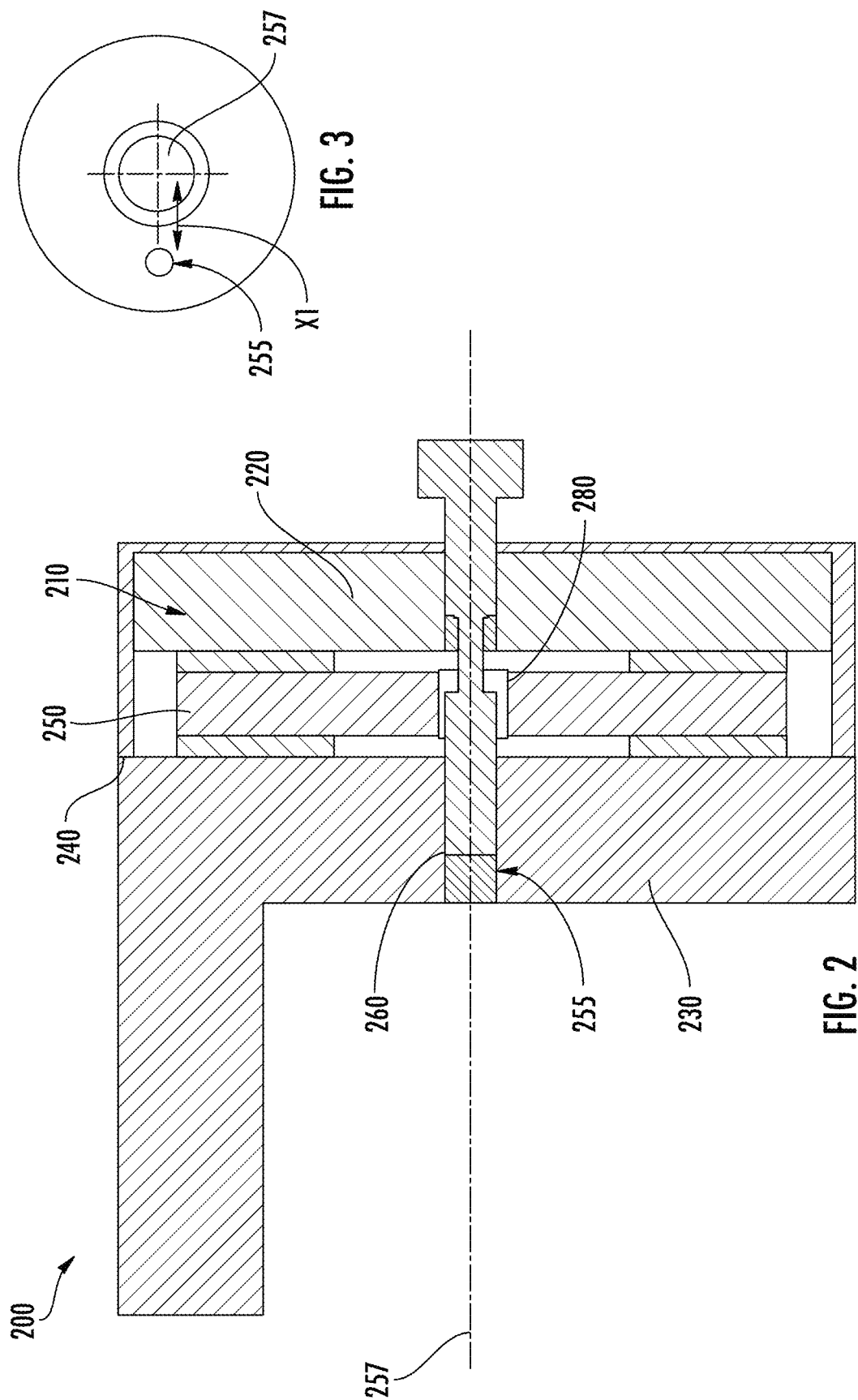

FAIL SAFE BAR FOR CLUTCH TYPE BRAKE ADJUSTMENT

BACKGROUND

The embodiments described herein relate to elevator systems and more specifically to an implementation of a fail-safe bar for adjusting a clutch type elevator brake.

Clutch type brakes on elevator machines may not be adjustable in the field. Elevator machines may require a mechanic to be on top of the elevator car to perform a brake adjustment.

SUMMARY

Disclosed is an elevator machine comprising: a plurality of stationary structures, including a proximate stationary structure and a distal stationary structure, a brake support that comprises the proximate stationary structure, a brake disc rotably supported in the brake support intermediate the plurality of stationary structures, the plurality of stationary structures and the brake disc each including a respective one of a plurality of orifices, and the plurality of orifices being mutually aligned and offset from a rotational axis of the brake disc to removably receive an elongated bar, wherein when the bar is positioned in the plurality of orifices, the brake disc is prevented from rotating, thereby preventing vertical movement of an elevator car in an elevator hoistway.

In addition to one or more of the above disclosed features or as an alternate a first orifice in the brake disc comprises one or more circumferentially extending slots, wherein the one or more circumferentially extending slots are radially aligned relative to the rotational axis for the brake disc.

In addition to one or more of the above disclosed features or as an alternate the bar is a bolt or pin that comprises an elongated axis, a proximate end, an intermediate portion, and a distal end, the proximate end including a head, wherein when the bar is positioned in the plurality of orifices, the distal end is operationally aligned with the distal stationary structure, the intermediate end is operationally aligned with the brake disc, and the head is operationally positioned against the brake support to prevent motion of the bar in a distal direction relative to the brake support.

In addition to one or more of the above disclosed features or as an alternate the proximate end and of the bar and the distal end of the bar comprise a nominal diameter and the intermediate portion of the bar includes a reduced diameter, and an axial span of the intermediate portion of the bar is larger than a thickness of the brake disc, whereby: when the bar is positioned in the plurality of orifices, rotation of the brake disc advances the brake disc into the intermediate portion of the bar, and a center shaft of the bar prevents further brake disc rotation, thereby preventing vertical movement of the elevator car.

In addition to one or more of the above disclosed features or as an alternate the axial span of the intermediate portion of the bar provides an interference force between the intermediate portion of the bar and opposing exterior side walls of the brake disc.

In addition to one or more of the above disclosed features or as an alternate radially extending walls at axial ends of the intermediate portion of the bar provide a normal force against axially opposing exterior side walls of the brake disc.

In addition to one or more of the above disclosed features or as an alternate the bar is a bolt, and the bolt includes threads along the nominal diameter for being threadingly received in one of the plurality of orifices.

In addition to one or more of the above disclosed features or as an alternate the distal end of the bar includes an axially extending slot for frictionally or threadingly receiving an axially extending boss of a retainer plate, the boss preventing the bar from moving past the proximal stationary structure when the retainer plate contacts the proximal stationary structure.

In addition to one or more of the above disclosed features or as an alternate a chain attaches the bar head to the brake support.

In addition to one or more of the above disclosed features or as an alternate a guard plate is pivotally connected to a proximate end of the brake support, the guard plate including a through hole sized for the bar head to pass through, wherein when the bar is positioned in the plurality of orifices and the bar head is against the brake support, pivoting of the guard plate moves the through-hole in a circumferential direction to provide access to a brake adjustment screw.

In addition to one or more of the above disclosed features or as an alternate the proximate stationary structure is a proximate exterior wall of the brake support, and the distal stationary structure is a distal structure in the brake support, or the machine includes a main machine support for operationally supporting a main machine that vertically moves the elevator car, and the main machine support including the distal stationary structure.

Further disclosed is a method of configuring an elevator machine to prevent vertical movement of an elevator car in an elevator hoistway, the machine comprising a plurality of stationary structures, including a proximate stationary structure and a distal stationary structure, a brake support that comprises the proximate stationary structure, a brake disc rotably supported in the brake support intermediate the plurality of stationary structures, the method comprising: providing each of the plurality of stationary structures and the brake disc each with a respective one of a plurality of orifices, wherein the plurality of orifices are mutually aligned and offset from a rotational axis of the brake disc to removably receive an elongated bar, and positioning the bar in the plurality of orifices, thereby preventing the brake disc from rotating.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

FIG. 2 illustrates a safety bar partially installed in a brake housing according to an embodiment, FIG. 3 illustrates an end view the safety bar installed in the brake housing according to an embodiment.

DETAILED DESCRIPTION

Figure 1:
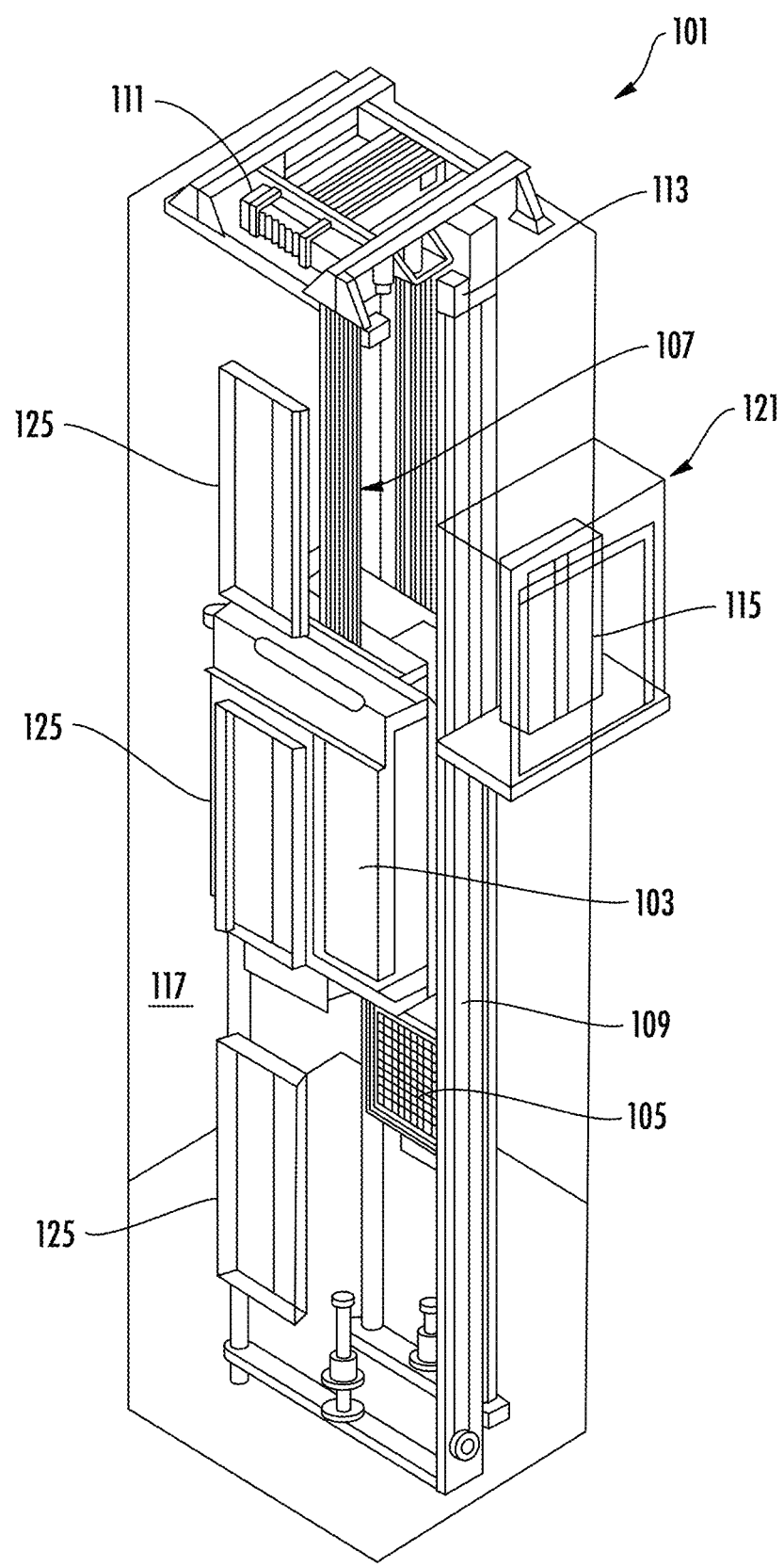
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator hoistway 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator hoistway 117, such as on a support or guide rail, and may be configured to provide position signals related to a position of the elevator car 103 within the elevator hoistway 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator hoistway 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator hoistway 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator hoistway 117.

Although shown and described with a roping system including tension member 107, elevator systems that employ other methods and mechanisms of moving an elevator car within an elevator hoistway may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1.

Turning to FIG. 2, disclosed is an elevator machine 200 comprising a plurality of stationary structures 210, including a proximate stationary structure 220 and a distal stationary structure 230. The machine 200 includes a brake support that is a housing 240 that may comprise the proximate stationary structure 220, and a brake disc 250 rotatably (that is, rotably) supported in the brake housing 240 intermediate the plurality of stationary structures 210. The plurality of stationary structures 210 and the brake disc 250 may each include a respective one of a plurality of orifices 255, which may be through or blind holes. In FIG. 2, the bar 260 is partially installed within the brake housing 240. As illustrated in FIG. 3, the plurality of orifices 255 may be mutually aligned and offset by a distance X1 with respect to a rotational axis 257 of the brake disc 250 to removably receive an elongated bar 260. With this configuration when the bar 260 is positioned in the plurality of orifices 255, the brake disc 250 is prevented from rotating, thereby preventing vertical movement of an elevator car 103 (FIG. 1) in an elevator hoistway 117 (FIG. 1).

Figure 4:
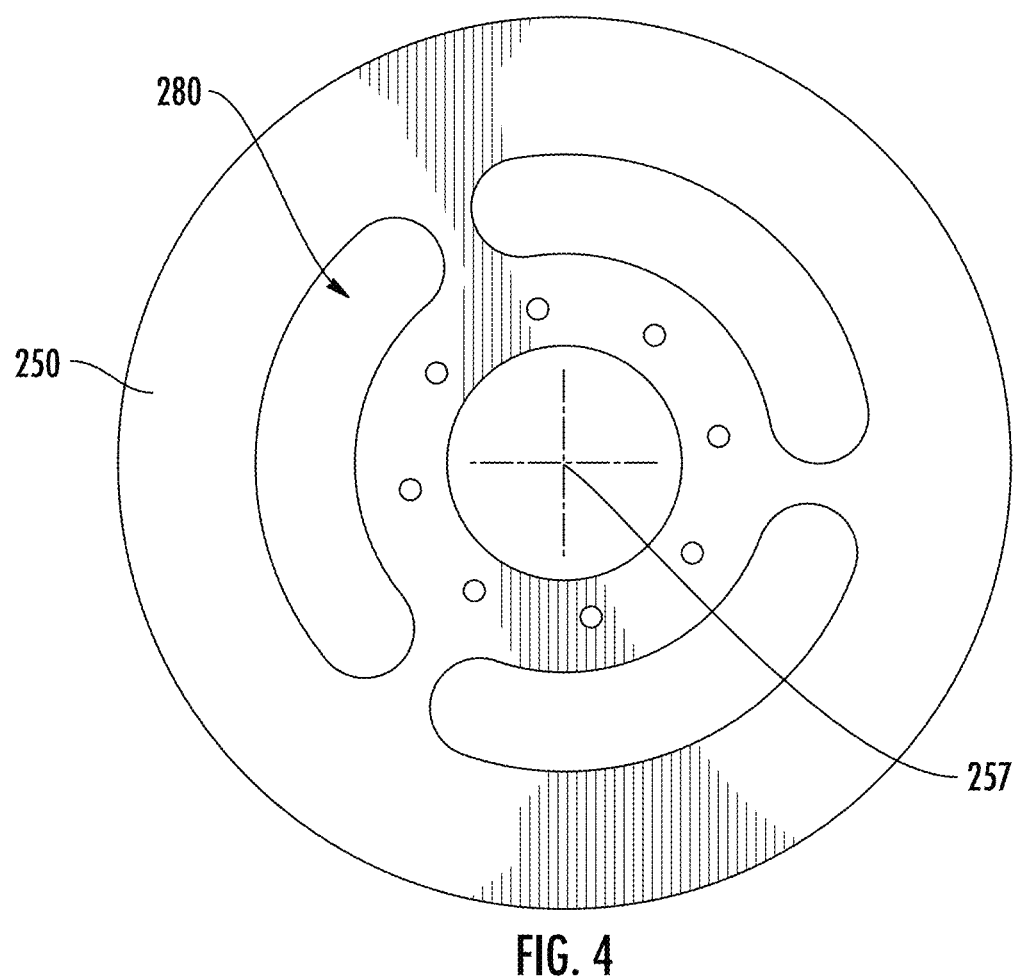
FIG. 4 illustrates a brake disc according to an embodiment.

Tuning to FIG. 4, in one embodiment a first orifice 280 in the brake disc 250 may comprise one or more circumferentially extending slots. The one or more circumferentially extending slots 280 may be radially aligned relative to the rotational axis 257 for the brake disc 250. Providing the plurality of slots increases the likelihood that the bar will engage the slot upon insertion into the system without fine adjustment of the elevator car position.

Figure 5:
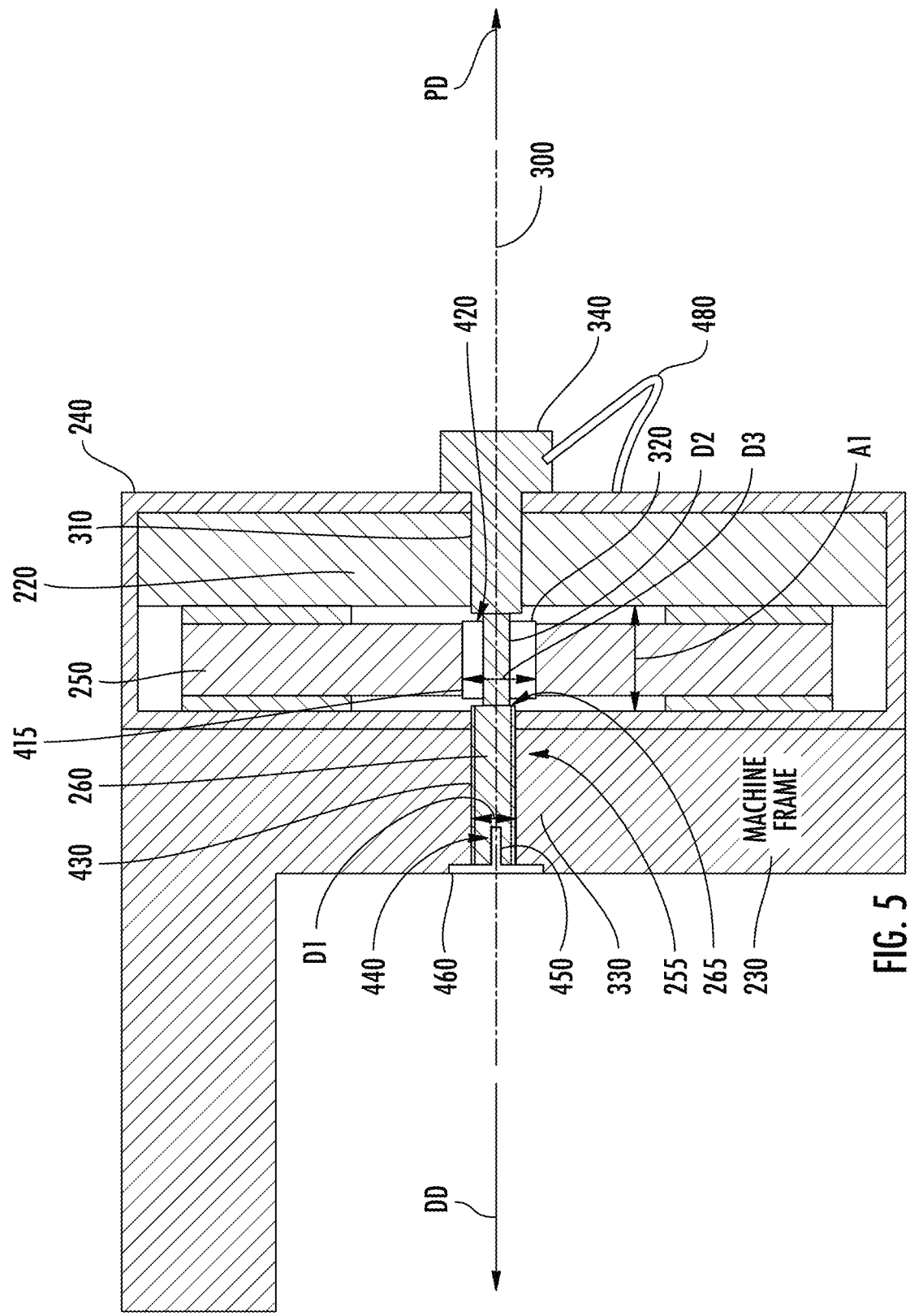
FIG. 5 illustrates a safety bar installed in a brake housing according to an embodiment.

Turning to FIG. 5, the bar 260 may be a bolt or pin that comprises an elongated axis 300, a proximate end 310, an intermediate portion 320, and a distal end 330. The proximate end 310 may include a head 340. With this configuration when the bar 260 is positioned in the plurality of orifices 255, the distal end 330 is operationally aligned with the distal stationary structure 230, the intermediate portion 320 is operationally aligned with the brake disc 250, and the head 340 is operationally positioned against the brake housing 240. The head 340 may prevent motion of the bar 260 in a distal direction DD relative to the brake housing 240.

In an embodiment the proximate end 310 of the bar 260 and the distal end 330 of the bar 260 comprise a nominal diameter D1. The intermediate portion 320 of the bar 260 may include a reduced diameter D2. An axial span A1 of the intermediate portion 320 of the bar 260 is associated with an area of decreased diameter of the bar and may be slightly larger than a thickness of the brake disc 250, which may provide for an ease of installation.

With this configuration when the bar 260 is positioned in the plurality of orifices 255, rotation of the brake disc 250 advances the brake disc 250 into the intermediate portion 320 of the bar 260. At that position the intermediate portion 320 of the bar 260 prevents further rotation of the brake disc 250. This configuration prevents vertical movement of the elevator car 103. In addition, if the brake disc has rotated to contact the bar, the bar could not be forcefully removed. The step in diameter between D1 and D2 creates radially extending walls 265 at opposing axial ends of the intermediate portion 320. The walls 265 exerts an axial force, or interference force, applied in a direction that is normal to opposing axial walls of the disc 250 if an attempt is made to remove the bar.

The nominal diameter D1 may be sized to frictionally engage the orifices 255 in the proximate and distal stationary structures. A diameter D3 of the orifice 415 in the brake disc 250, however, may be larger than the nominal diameter D1. With this configuration, inserting and removing the bar 260 from the brake housing 240 avoids potentially damaging contact between the 260 bar and the brake disc 250 and may provide for an increased ease of installation.

The axial span A1 of the intermediate portion 320 of the bar 260 may be slightly larger than the brake disc 250. This configuration assures that the brake disk 250 will fit within the span of the intermediate portion 320 during unintended motion of the elevator car 103.

In an embodiment the bar 260 may be a bolt that includes threads 430 along the nominal diameter D1. With this configuration the bar 260 may be threadingly received in one of the plurality of orifices 255. Specifically the bar 260 may be threadingly received in the proximate stationary structure 220 or the distal stationary structure 230.

The distal end 330 of the bar 260 may include an axially extending slot 440 for frictionally or threadingly receiving an axially extending boss 450 of a retainer plate 460 when the bar is positioned in the plurality of orifices 255. This configuration may prevent the bar 260 from being completely removed from the brake housing 240. In an embodiment the retainer plate 460 may be operationally connected to the proximate stationary structure 220. In this embodiment the disc and distal stationary structure may have a clearance hole to accommodate the retainer plate. This embodiment may prevent the full removal of the bar while allowing the elevator to operate normally.

Figure 7:
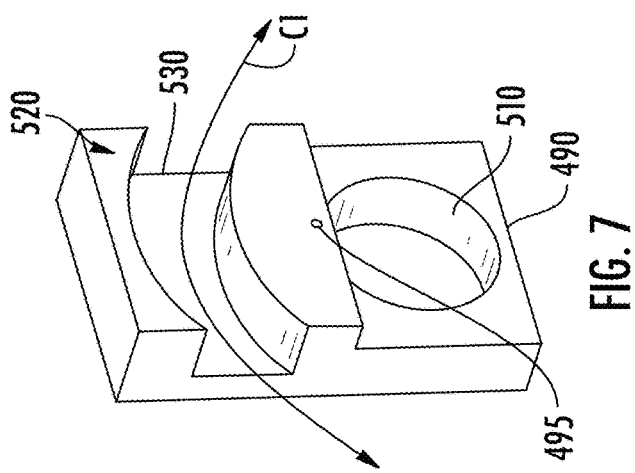
FIG. 7 illustrates a guard plate according to an embodiment.
Figure 6:
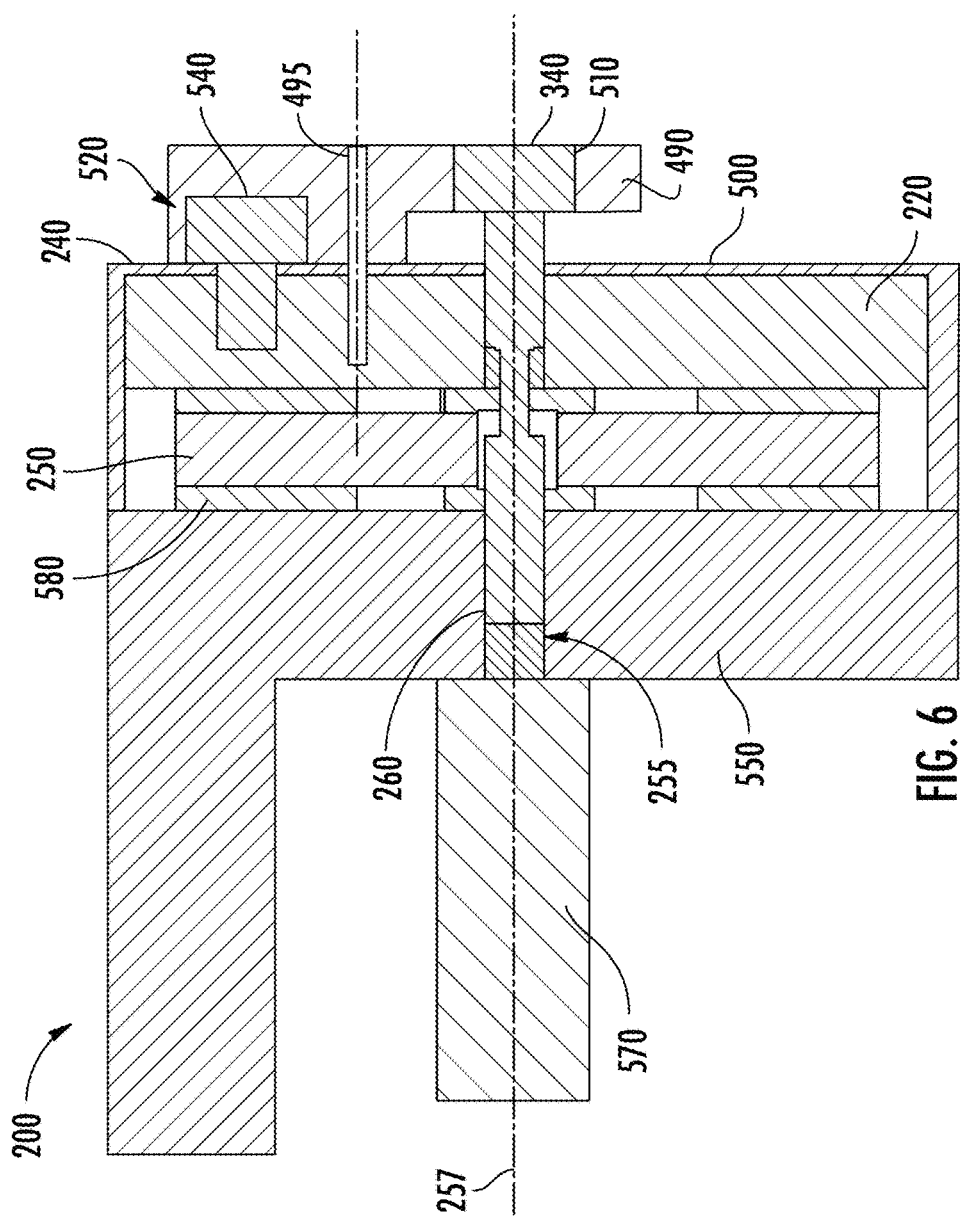
FIG. 6 illustrates a safety bar installed in a brake housing, wherein a guard plate is provided, according to an embodiment.

A chain 480 may attach the bar head 340 to the brake housing 240. In addition, or alternatively, as illustrated in FIGS. 6 and 7, a guard plate 490 may be pivotally connected for example by a pin 495 to a proximate end 500 of the brake housing 240. The guard plate 490 may include a throughhole 510 sized for the bar head 340 to pass through. With this configuration when the bar 260 is positioned in the plurality of orifices 255 and the bar head 340 is against the brake housing 240, pivoting of the guard plate 490 moves the through-hole 510 for the guard plate 490 in a circumferential direction C1, while another portion of the guard plate 520, which may be a top portion, pivots over the bar head 340 to allow access to the brake adjustment screw 540. This configuration ensures that the brake adjustment screw is only accessible if the bar is fully inserted into the brake disc.

The guard plate 490 may have a circumferentially extending slot 530 to enable pivoting over an adjustment bolt 540 extending partially through the proximate stationary structure 220.

In one embodiment the proximate stationary structure 220 is a proximate exterior wall of the brake housing 240. The distal stationary structure 230 may be a distal structure in the brake housing 240. Alternatively the machine 200 includes a main machine support which may be a main machine housing 550 for operationally housing a main machine 560 for example having a main machine drive shaft 570 that vertically moves the elevator car 103 (FIG. 1). In this embodiment the main machine housing 560 may include the distal stationary structure 230. As provided in the illustration, one or more brake disc linings 580 may be used to provide frictional force between stationary components and the disc. The linings also serve to position the lining disc.

With the above disclosed embodiments a bolt with a variable diameter may be provided to enable for relatively safe brake adjustments. A clearance hole for the bolt may be retrofitted and/or manufactured into a rotating component of the brake. Prior to initiating a brake adjustment, the bolt may be inserted across the moving and stationary components of the brake. The bolt may include a relatively smaller diameter where the bolt intersects with moving components of the brake. If there is an error in adjustment, a rotating brake component (brake disc or perhaps other rotating component) may rotate slightly until is stopped by the bolt. Once the rotating brake component contacts the bolt, further rotation may be prevented. The brake may be at that time readjusted and repositioned, and upon completion the bolt may be removed.

It is to be appreciated that more than a single bar may be used per brake system. In addition the disclosed embodiments apply to single brakes and stacked brake configurations. It is to be further appreciated that the disclosed embodiments are applicable to any kind of brake, not only to clutch type brakes.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:
1. An elevator machine comprising:
a plurality of stationary structures, including a proximate stationary structure and a distal stationary structure,
a brake support that comprises the proximate stationary structure,
a brake disc rotably supported in the brake support intermediate of the plurality of stationary structures,
the plurality of stationary structures and the brake disc each including a respective one of a plurality of orifices, and the plurality of orifices being mutually aligned and offset from a rotational axis of the brake disc to removably receive an elongated bar, wherein when the bar is positioned in the plurality of orifices, the brake disc is prevented from rotating thereby preventing vertical movement of an elevator car in an elevator hoistway, wherein the bar is a bolt or pin that comprises an elongated axis, a proximate end, an intermediate portion, and a distal end, the proximate end including a head, wherein:

when the bar is positioned in the plurality of orifices, the distal end is operationally aligned with the distal stationary structure, the intermediate end is operationally aligned with one of the plurality of orifices of the brake disc, and the head is operationally positioned against the brake support to prevent motion of the bar in a distal direction relative to the brake support.

2. The machine of claim 1 wherein:

the proximate end and of the bar and the distal end of the bar comprise a nominal diameter and the intermediate portion of the bar includes a reduced diameter, and an axial span of the intermediate portion of the bar is larger than a thickness of the brake disc, whereby:

when the bar is positioned in any of the plurality of orifices, rotation of the brake disc advances the brake disc into the intermediate portion of the bar, and a center shaft of the bar prevents further brake disc rotation, thereby preventing vertical movement of the elevator car.

3. The machine of claim 2 wherein the axial span of the intermediate portion of the bar provides an interference force between the intermediate portion of the bar and opposing exterior side walls of the brake disc.

4. The machine of claim 3 wherein radially extending walls at axial ends of the intermediate portion of the bar provide a normal force against axially opposing exterior side walls of the brake disc.

5. The machine of claim 1 wherein a chain attaches the bar head to the brake support.

6. The machine of claim 1 wherein:

a guard plate is pivotally connected to a proximate end of the brake support, the guard plate including a through hole sized for the bar head to pass through, wherein when the bar is positioned in the plurality of orifices and the bar head is against the brake support, pivoting of the guard plate moves the through-hole in a circumferential direction to provide access to a brake adjustment screw.

7. An elevator machine comprising:

a plurality of stationary structures, including a proximate stationary structure and a distal stationary structure, a brake support that comprises the proximate stationary structure, a brake disc rotably supported in the brake support intermediate of the plurality or stationary structures, the plurality of stationary structures and the brake disc each including a respective one of a plurality of orifices, and the plurality of orifices being mutually attuned and offset from a rotational axis of the brake disc to removably receive an elongated bar wherein when the bar is positioned in the plurality of orifices, the brake disc is prevented from rotating, thereby preventing vertical movement of an elevator cat in an elevator hoistway, wherein the bar is a bolt, and the bolt includes threads along a nominal diameter for being threadingly received in one of the plurality of orifices.

8. An elevator machine comprising:

a plurality of stationary structures, including a proximate stationary structure and a distal stationary structure, a brake support that comprises the proximate stationary structure, a brake disc rotably supported in the brake support intermediate of the plurality of stationary structures, the plurality of stationary structures and the brake disc each including a respective one of a plurality of orifices, and the plurality of orifices being mutually aligned and offset from a rotational axis of the brake disc to removably receive an elongated bar, wherein when the bar is positioned in the plurality of orifices, the brake disc is prevented from rotating, thereby preventing vertical movement of an elevator car in an elevator hoistway, wherein the distal end of the bar includes an axially extending slot for frictionally or threadingly receiving an axially extending boss of a retainer plate, the boss preventing the bar from moving past the proximal stationary structure when the retainer plate contacts the proximal stationary structure.

9. A method of configuring an elevator machine to prevent vertical movement of an elevator car in an elevator hoistway, the machine comprising a plurality of stationary structures, including a proximate stationary structure and a distal stationary structure, a brake support that comprises the proximate stationary structure, a brake disc rotably supported in the brake support intermediate of the plurality of stationary structures, the method comprising:

providing each of the plurality of stationary structures and the brake disc each with a respective one of a plurality of orifices, wherein the plurality of orifices are mutually aliened and offset from a rotational axis of the brake disc to removably receive an elongated bar, and positioning the bar in any one of the plurality of orifices, thereby preventing the brake disc from rotating, wherein the bar is a bolt or pin that comprises an elongated axis, a proximate end, an intermediate portion, and a distal end, the proximate end including a head, wherein: when the bar is positioned in one of the plurality of orifices, the distal end is operationally aligned with the distal stationary structure, the intermediate end is operationally aliened with the brake disc, and the head is operationally positioned against the brake support to prevent motion of the bar in a distal direction relative to the brake support, and wherein:

the proximate end and of the bar and the distal end of the bar comprise a nominal diameter and the intermediate portion of the bar includes a reduced diameter, and an axial span of the intermediate portion of the bar is larger than a thickness of the brake disc, whereby:

when the bar is positioned in one of the plurality of orifices, rotation of the brake disc advances the brake disc into the intermediate portion of the bar, and a center shaft of the bar prevents further brake disc rotation, thereby preventing vertical movement of the elevator car.

10. The method of claim 9 wherein the axial span of the intermediate portion of the bar provides an interference force between the intermediate portion of the bar and opposing exterior side walls of the brake disc.

11. The method of claim 10 wherein radially extending walls at axial ends of the intermediate portion of the bar provide a normal force against axially opposing exterior side walls of the brake disc.

12. A method of configuring an elevator machine to prevent vertical movement of an elevator car in an elevator hoistway, the machine comprising a plurality of stationary structures, including a proximate stationary structure and a distal stationary structure, a brake support that comprises the proximate stationary structure, a brake disc rotably supported in the brake support intermediate of the plurality of stationary structures, the method comprising:

providing each of the plurality of stationary structures and the brake disc each with a respective one of a plurality of orifices, wherein the plurality of orifices are mutually aligned and offset from a rotational axis of the brake disc to removably receive an elongated bar, and positioning the bar in any one of the plurality of orifices, thereby preventing the brake disc from rotating, wherein the bar is a bolt, and the bolt includes threads along a nominal diameter for being threadingly received in one of the plurality of orifices.

13. A method or continuing an elevator machine to prevent vertical movement of an elevator car in an elevator hoistway, the machine comprising a plurality of stationary structures, including a proximate stationary structure and a distal stationary structure, a brake support that comprises the proximate stationary structure, a brake disc rotably supported in the brake support intermediate of the plurality of stationary structures, the method comprising:

providing each of the plurality of stationary structures and the brake disc each with a respective one of a plurality of orifices, wherein the plurality of orifices are mutually aligned and offset from a rotational axis of the brake disc to removably receive an elongated bar, and positioning the bar in any one of the plurality of orifices, thereby preventing the brake disc from rotating, wherein the distal end of the bar includes an axially extending slot for frictionally or threadingly receiving an axially extending boss of a retainer plate, the boss preventing the bar from moving past the proximal stationary structure when the retainer plate contacts the proximal stationary structure.

14. A method or configuring an elevator machine to prevent vertical movement of an elevator car in an elevator hoistway, the machine comprising a plurality of stationary structures, including a proximate stationary structure and a distal stationary structure, a brake support that comprises the proximate stationary structure, a brake disc rotably supported in the brake support intermediate of the plurality of stationary structures, the method comprising:

providing each of the plurality of stationary structures and the brake disc each with a respective rare of a plurality of orifices, wherein the plurality of orifices are mutually aligned and offset from a rotational axis of the brake disc to removably receive an elongated bar, and positioning the bar in any one of the plurality of orifices, thereby preventing the brake disc from rotating, wherein the bar is a bolt or pin that comprises an elongated axis, a proximate end, an intermediate portion, and a distal end, the proximate end including a head, wherein: when the bar is positioned in one of the plurality of orifices, the distal end is operationally aligned with the distal stationary structure, the intermediate end is operationally aliened with the brake disc, and the head is operationally positioned against the brake support to prevent motion of the bar in a distal direction relative to the brake support, and wherein a chain attaches the bar head to the brake support.

* * * * *